Patented Aug. 3, 1926.

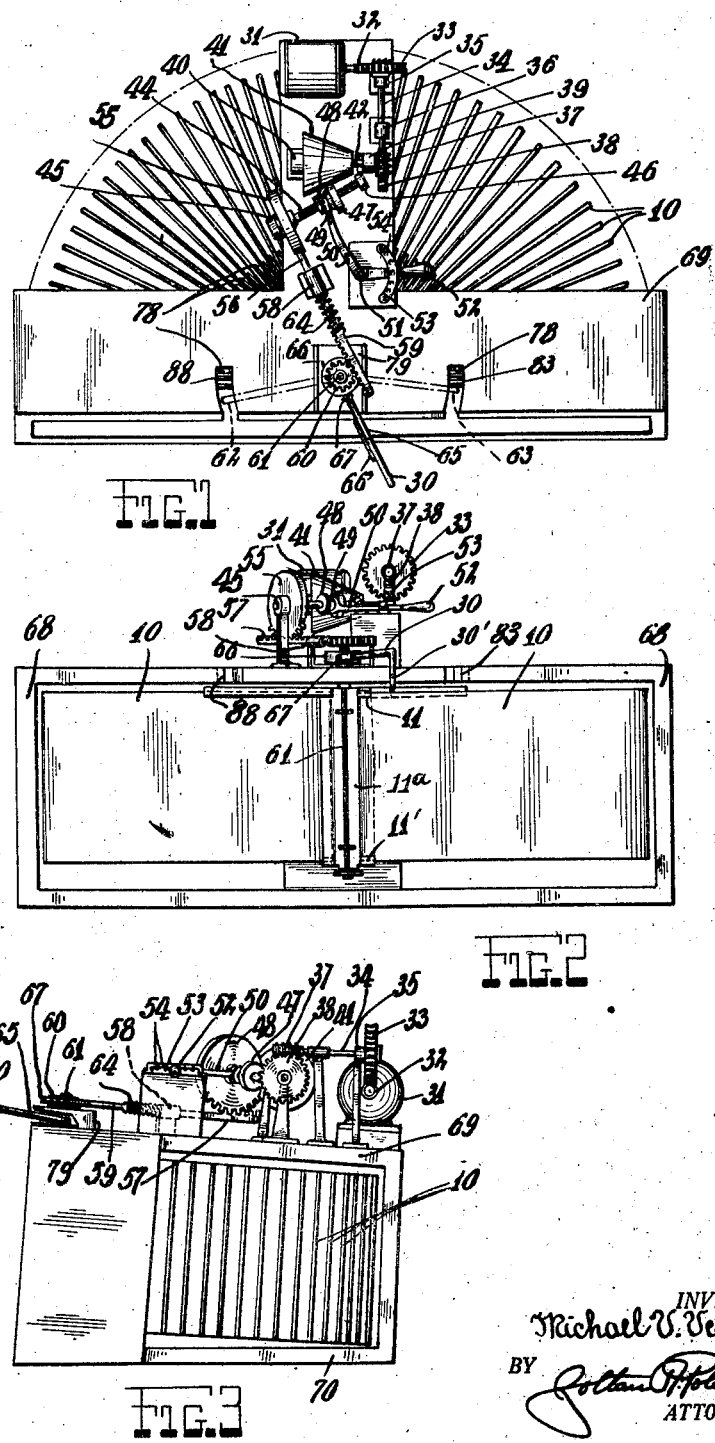

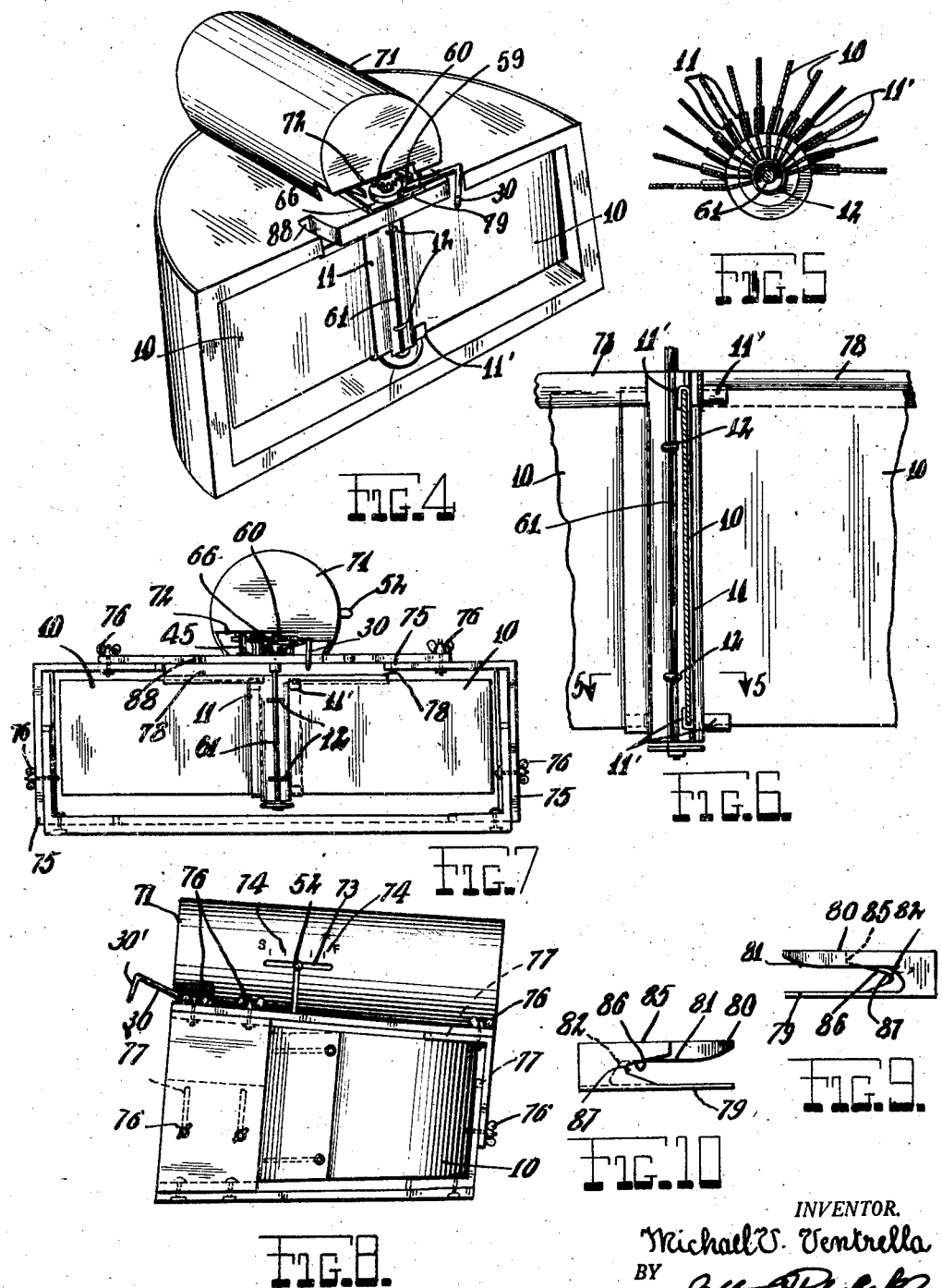

1,594,914

UNITED STATES PATENT OFFICE.

MICHAEL V. VENTRELLA, OF BRONX, NEW YORK.

AUTOMATIC ROTARY BOOK DISPLAY.

Application filed December 11, 1925. Serial No. 74,770.

This invention relates generally to advertising devices, the invention having more particular reference to a novel type of advertising device.

The invention has for an object the provision of an improved advertising device in which cards having advertising or display matter may be exposed to view one after the other.

For further comprehension of the invention, and of the objects and advantages thereof, reference will be had to the following description and accompanying drawings, and to the appended claims in which the various novel features of the invention are more particularly set forth.

Fig. 1 of the drawings is a top plan view of my improved advertising device.

Fig. 2 of the drawings is a front view thereof.

Fig. 3 of the drawings is a side view thereof.

Fig. 4 of the drawings is a front perspective view of my improved device showing the working parts enclosed by a case or cover.

Fig. 5 of the drawings is a sectional view taken on the line 5—5 of Figure 6.

Fig. 6 of the drawings is an enlarged fragmentary detail view of my improved device.

Fig. 7 of the drawings is a front view of a modification of my improved device.

Fig. 8 of the drawings is a side view thereof.

Fig. 9 of the drawings is an enlarged fragmentary detail view.

Fig. 10 is a similar view of a detail thereof.

My improved advertising device comprises a plurality of cards 10 having advertising or display matter printed thereon. The cards 10 are attached to the upper clips 11 and the lower clips 11', said clips being held by connecting strips 11ª which have apertures located therein to accommodate the rings 12. The gear 60 is attached at or near the upper extremity of the vertical shaft 61, rotatively mounted in suitable bearings. The finger 30 having a vertical extremity 30' is jointed to the arm 65 by means of the spring 66', so as to afford a certain amount of flexibility. The arm 65 is pivotally attached to the collar 66, as at 67. The collar 66 is attached to the vertical shaft 61.

As a means of operating the said finger 30, I have provided an electric motor 31 connected to any suitable source of power, and having a worm 32 attached thereto meshing with a worm wheel 33 attached to a shaft 34 rotatively mounted in suitable bearings 35 and 36, and having a second worm 37 attached thereto meshing with a second worm wheel 38 attached to a shaft 42 rotatively mounted in suitable bearings 39 and 40 and having a cone 41 attached thereto. The shaft 44 is rotatively mounted in suitable bearings 45 and 46 and has slidably attached thereto a friction wheel 47 so located as to make contact with the periphery of the cone 41. The friction wheel 47 is provided with a grooved portion 48 to accommodate the fork 49 of the lever 50 which is pivoted as at 51 and has attached thereto a suitable and conveniently located handle 52, as a means of sliding the friction wheel 47 along the cone 41 in order to vary the speed of the shaft 44. As a means of holding the friction wheel 47 in any desired relative position, I have provided a sector 53 having notches 54 or protruding portions to engage the handle 52.

The intermittent gear 55 is attached to the shaft 56 and meshes with a rack 57 cut or otherwise formed on the shaft 56 which is a slidable fit in the bearing 58 and has cut or otherwise formed thereon a second rack 59 meshing with the gear 60 which is attached to the vertical shaft 61. The heretobefore described construction being such as will move the finger from the position as designated by the numeral 62, to the position designated by the numeral 63 Fig. 1. As a means of returning the finger to the position as designated by the numeral 62 I have provided a coil spring 64 wound in the shaft 56 and superimposed thereon.

It will be understood that the cards 10 are suitably encased in a suitable and attractive frame, such as designated by the numeral 68, have a top 69, to support the heretobefore described working parts, and a base 70, it being further understood that the top 69 and base 70 may be of any suitable attractive shape or design.

As a means of enclosing the hereinbefore described working parts, I have provided a suitable cover 71, having an elongated slot 72 to accommodate the finger 30, so as to permit of the movement thereof, and an elongated aperture 73, to accommodate the handle 52 which protrudes therefrom. The cover has suitable identification marks 74 to designate the speed of the friction wheel.

The identification marks 74 are adjacent to the handle which protrudes from the cover.

Referring in particular to Figures 7 and 8 showing a modification of my improved advertising device, in order to accommodate cards of various sizes, it is necessary to provide a means of extending the frame members 75 in a vertical and horizontal position. For this purpose, the frame members 75 are of telescopic construction and are attached to one another by means of wing nuts 76 conveniently located in slots 77.

I have above described the movement of the finger 30, and it will be further understood that the upper clips 11 are provided with a protruding portion 78 located at the rear of each of the said cards and extending slightly above the top edge of the said cards. It will be also understood that the cam member 79 is suitably attached to the top 69, and has an upright portion 80 with an elongated slot 81 to engage the arm 65, and a tapered extremity 82 so located as to force the said finger 30 downward so as to cause the vertical extremity 30' to engage between the card designated by the numeral 83, Figure 1, and the protruding portion 78, designated by the numeral 84, Figure 1.

The cam member 79 has also a second upright portion 85 with an elongated slot 86 to engage the finger 30, and a tapered extremity 87 to disengage the vertical extremity 30' from between the card designated by the numeral 83, and the protruding portion 78, designated by the numeral 84, when the vertical extremity 31 has moved the card 10, designated by the numeral 83, to the position designated by the numeral 88.

It is obvious that I have provided a means of exposing to view a plurality of cards having advertising or display matter printed or otherwise placed thereon, one after the other.

While I have above described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new, and desire to protect by Letters Patent of the United States is as follows:—

1. In an automatic rotary book display having leaves, a means for intermittently turning said leaves, comprising a worm gear train driven by an electric motor, a friction cone connected with said train, a friction wheel adjustable along the face of said cone, a shaft supporting said friction wheel, an intermittent gear fixed to said shaft, a rack slidably mounted, meshing with said intermittent gear, and normally urged in a direction counter to the said intermittent gear action, by a spring acting between said rack and a stationary part, another rack rigidly connected with said rack, a gear meshing with said second mentioned rack, a shaft rotatably mounted supporting said gear, and means for turning the said leaves, operated by the said latter mentioned shaft.

2. In an automatic rotary book display having leaves, a means for intermittently turning said leaves, comprising a worm gear train driven by an electric motor, a friction cone connected with said train, a friction wheel manually adjustable along the face of said cone, characterized by a handle, a lever connected to said handle, and having a forked end, said friction wheel being formed with a grooved portion engaged by said forked end, a shaft supporting said friction wheel, an intermittent gear fixed to said shaft, a rack slidably mounted, meshing with said intermittent gear, and normally urged in a direction counter to the said intermittent gear action, by a spring acting between said rack and a stationary part, another rack rigidly connected with said rack, a gear meshing with said second mentioned rack, a shaft rotatably mounted supporting said gear, and means for turning the said leaves, operated by the said latter mentioned shaft.

3. In an automatic rotary book display having leaves, a means for intermittently turning said leaves, comprising a worm gear train driven by an electric motor, a friction cone connected with said train, a friction wheel adjustable along the face of said cone, a shaft supporting said friction wheel, an intermittent gear fixed to said shaft, a rack slidably mounted, meshing with said intermittent gear, and normally urged in a direction counter to the said intermittent gear action, another rack rigidly connected with said rack, a gear meshing with said second mentioned rack, a shaft rotatably mounted supporting said gear, and means for turning the said leaves, operated by the said latter mentioned shaft.

In testimony whereof I have affixed my signature.

MICHAEL V. VENTRELLA.